United States Patent
Tsukamoto et al.

(10) Patent No.: US 6,545,971 B1
(45) Date of Patent: Apr. 8, 2003

(54) INFORMATION RECORDING/REPRODUCING SYSTEM FOR RECORDING/REPRODUCING INFORMATION IN THREE-DIMENSIONAL RECORDING MEDIUM OF A LIGHT PASSING-THROUGH TYPE

(75) Inventors: Takayuki Tsukamoto, Tachikawa (JP); Hideyuki Nishizawa, Tokyo-To (JP); Akiko Hirao, Chiba (JP)

(73) Assignee: Kabushiki Kaisha Toshiba, Kawasaki (JP)

( * ) Notice: Subject to any disclaimer, the term of this patent is extended or adjusted under 35 U.S.C. 154(b) by 0 days.

(21) Appl. No.: 09/492,117

(22) Filed: Jan. 27, 2000

(30) Foreign Application Priority Data

Jan. 27, 1999 (JP) .......................... 11-018204
Sep. 16, 1999 (JP) .......................... 11-261905

(51) Int. Cl.[7] .......................................... G11B 7/0037
(52) U.S. Cl. .................. 369/116; 369/103; 369/122
(58) Field of Search ................. 369/116, 103, 369/121, 122

(56) References Cited

U.S. PATENT DOCUMENTS

| 4,699,446 | A | * | 10/1987 | Banton et al. ............. 350/3.71 |
| 4,867,560 | A | * | 9/1989 | Kunitsugu ................. 356/152 |
| 4,878,222 | A | * | 10/1989 | Lawewnce ................. 372/48 |
| 4,878,225 | A | * | 10/1989 | Aiba et al. ................ 372/38 |
| 5,392,273 | A | * | 2/1995 | Masaki et al. ............. 369/106 |
| 5,526,338 | A |   | 6/1996 | Hasman et al. |
| 5,796,498 | A | * | 8/1998 | French ..................... 359/4 |
| 5,912,726 | A | * | 6/1999 | Toguchi et al. ............ 355/53 |
| 5,974,009 | A | * | 10/1999 | Tamura et al. ............ 369/44.29 |
| 6,023,320 | A | * | 2/2000 | Kawashima ................ 355/53 |
| 6,143,468 | A | * | 11/2000 | Ohno et al. ............. 430/270.13 |
| 6,147,942 | A | * | 11/2000 | Abe et al. ................ 369/44.27 |
| 6,246,646 | B1| * | 6/2001 | Abe et al. ................ 369/44.27 |

FOREIGN PATENT DOCUMENTS

| JP | 02-308431 | 12/1990 |
| JP | 03-049054 | 3/1991 |
| JP | 6-118306 | 4/1994 |
| JP | 10-3684 | 1/1998 |
| JP | 11-126335 | 5/1999 |
| WO | WO 97/23872 | 7/1997 |

* cited by examiner

Primary Examiner—Doris H. To
Assistant Examiner—Gautam R. Patel
(74) Attorney, Agent, or Firm—Oblon, Spivak, McClelland, Maier & Neustadt, P.C.

(57) ABSTRACT

A recording/reproducing system records/reproduces information in a three-dimensional optical recording medium wherein information is recordable at three-dimensional optional positions and wherein position reference regions having optical characteristics different from those of recordable regions are previously provided at predetermined positions, and for reproducing information recorded in the three-dimensional optical recording medium. The recording system comprises a light source, a detector, a moving mechanism, and a light intensity adjuster. The reproducing system comprises a light source, a condenser, a detector, a moving mechanism, and a reproducing device.

12 Claims, 7 Drawing Sheets

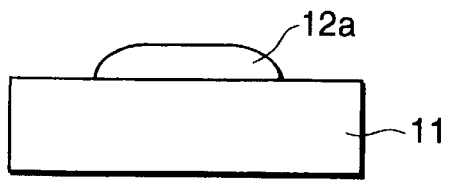
FIG. 3A
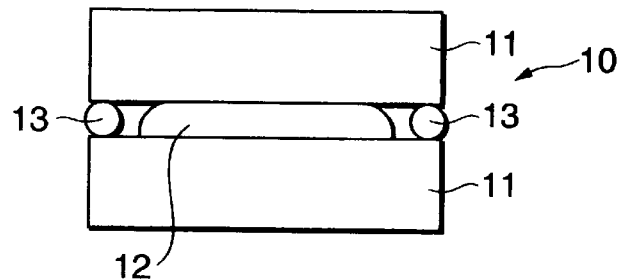
FIG. 3B
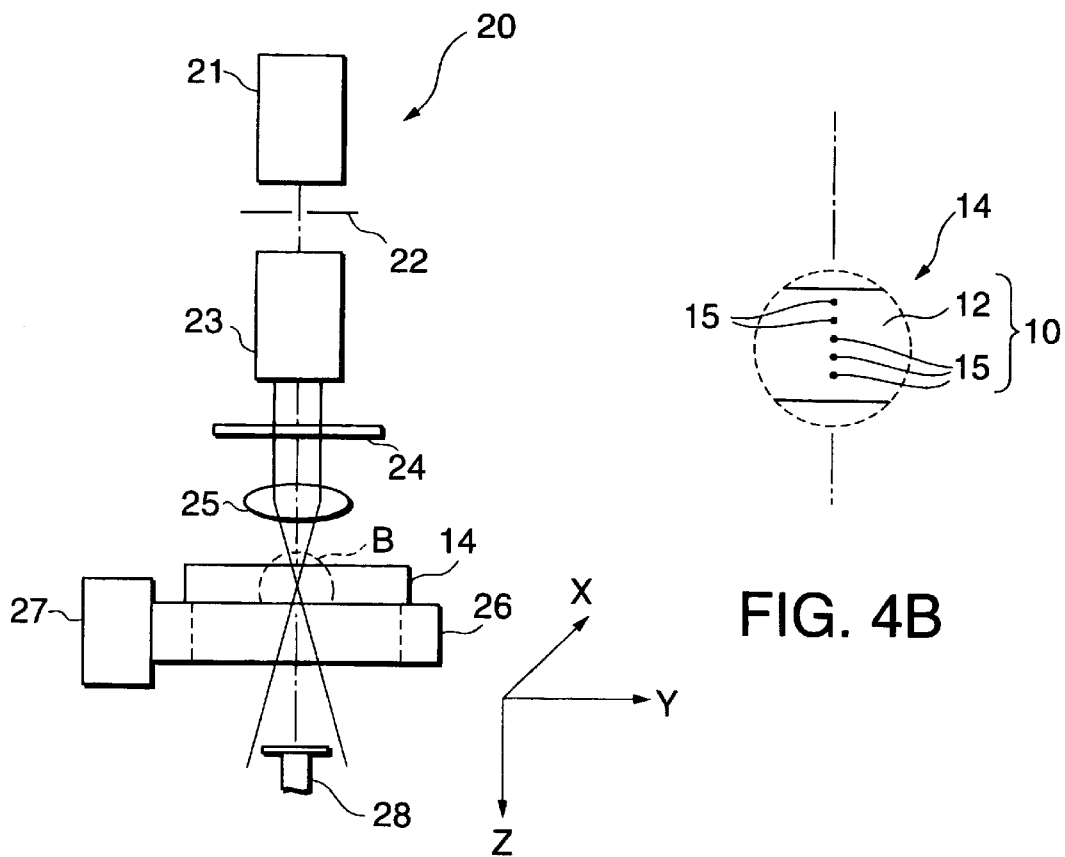
FIG. 4A
FIG. 4B

INFORMATION RECORDING/
REPRODUCING SYSTEM FOR RECORDING/
REPRODUCING INFORMATION IN THREE-
DIMENSIONAL RECORDING MEDIUM OF A
LIGHT PASSING-THROUGH TYPE

BACKGROUND OF THE INVENTION

The present invention relates generally to an information recording/reproducing system for recording information in a three-dimensional optical recording medium and for reproducing information recorded in the medium. More specifically, the invention relates to an information recording/reproducing system for recording information in three-dimensional directions in an optical recording medium wherein digital data are recordable in three-dimensional directions, and for reproducing information recorded in the optical recording medium while precisely positioning recording and reproducing light beams in depth directions.

In recent years, the enhancement of density of optical recording media, such as optical disks, rapidly proceeds in information processing systems, such as computers. As such density-enhanced optical recording media, optical disks having a plurality of recording layers in depth directions have been studied.

In such optical recording disks having a plurality of recording layers, if a system for reading information included in reflected light beams, which are reflected on the respective layers, using the reflectance of the respective recording layers is adopted, the reflectance of the respective recording layers decreases as the increase of the number of the layers in accordance with the relationship between transmission and reflection, so that the signal strength decreases.

Against such a technique using reflected light beams, an optical head system adopting a system for recording transmitted light beams passing through a multilayered phase recording medium without using reflection on recording layers is disclosed in, e.g., Japanese Patent Laid Open No. 10-3684.

FIG. 1. shows a conventional information reproducing system for reading the transmittance of a multilayered phase recording medium. In this figure, light beams emitted from light irradiation means 1, such as a semiconductor laser, are collimated by a collimator lens 2, and part of the light beams pass through a beam splitter 3, such as a half mirror, to enter an objective lens 4 to be condensed in a phase type three-dimensional optical disk 5. Then, the light beams passing through the three-dimensional optical disk 5 are reflected on the reverse surface of the optical disk 5 to enter the objective lens 4 again as reflected light beams, and part of the reflected light beams are reflected by the beam splitter 3 to be detected by a photo detector 6.

As shown in FIG. 1, in the conventional reproducing system for the three-dimensional optical recording medium, it is required to further provide a phase/intensity modulating plate 7 to recondense light beams, which pass through the plate 7, on a pinhole 9 by means of a recondenser lens 8 to irradiate the photo detector 6 with laser beams passing through the pinhole 9.

As described above, the conventional reproducing system for the phase type three-dimensional recording medium requires additional constructions, such as the phase/intensity modulating plate, so that there are problems in that it is difficult to commonly use optical recording/reproducing systems, which have been widely used until now, and it is difficult to miniaturize the whole system.

In addition, the above described conventional information reproducing system for the three-dimensional recording medium does not take measures to cope with the adjustment of the focus of recording or reproducing light beams in depth directions. Therefore, when information is recorded on the three-dimensional optical recording medium or when information is read from the three-dimensional recording medium, it is difficult to adjust the focus of recording or reproducing light beams in depth directions, so that there is a problem in that it is not possible to obtain satisfied recording precision and reproducing precision.

Moreover, when data are recorded/reproduced in/from a plurality of layers having different depths of the above described three-dimensional optical recording medium, the distance between the objective lens and the recording medium must be adjusted for each of the different depths, so that there is a problem in that the time required for this adjustment prevents the accelerating of the recording/reproducing of data as the whole system.

SUMMERY OF THE INVENTION

It is therefore an object of the present invention to eliminate the aforementioned problems and to provide a compact information recording/reproducing system capable of rapidly writing and reading data in/from a three-dimensional optical recording medium while positioning the three-dimensional optical recording medium in depth directions by utilizing an optical recording/reproducing system which has been used until now.

In order to accomplish the aforementioned and other objects, according to a first aspect of the present invention, there is provided a recording system for recording information in a three-dimensional optical recording medium wherein information is recordable at three-dimensional optional positions and wherein position reference regions having optical characteristics different from those of recordable regions are previously provided at predetermined positions, the recording system comprising: a light source configured to irradiate the vicinity of each of the position reference regions of the three-dimensional optical recording medium with a condensed light beam; a detector configured to detect the intensity of the light beam passing through the three-dimensional optical recording medium; a moving mechanism configured to move the condensed position of the light beam, which is emitted from the light source, with respect to the three-dimensional optical recording medium on the basis of the detected result obtained by the detector; and a light intensity adjuster configured to change the intensity of the light beam, which is emitted from the light source to the three-dimensional optical recording medium, to a recordable intensity.

According to a second aspect of the present invention, there is provided a reproducing system for reproducing recorded information from a three-dimensional optical recording medium capable of recording information at three-dimensional optional positions, the reproducing system comprising: a light source configured to irradiate the three-dimensional optical recording medium; a condenser configured to condense the light beam, which is emitted from the light source, in the vicinity of each of position reference regions which are previously provided at predetermined positions of the three-dimensional optical recording medium and which have optical characteristics different from those of recordable regions, or in the vicinity of each of recording regions for information recorded in the recordable regions; a detector configured to detect the intensity of the reference light beam passing through the three-dimensional optical recording medium; a moving mechanism configured to move the condensed position of the light beam, which is emitted from the light source, with respect to the three-dimensional optical recording medium on the basis of the detected result obtained by the detector; and a reproducing device configured to reproduce information by detecting the intensity of transmitted light of a reproducing light beam emitted from the light source to the three-dimensional optical recording medium.

According to a third aspect of the present invention, there is provided a recording system for recording information in a three-dimensional optical recording medium wherein information is recordable at three-dimensional optional positions and wherein position reference regions having optical characteristics different from those of recordable regions are previously provided at predetermined positions, the recording system comprising: a light source configured to irradiate the three-dimensional optical recording medium with light beams of a plurality of patterns having different wavelengths containing at least one of a positioning reference light beam having a first wavelength, an information recording light beam having an intensity sufficient to record information, and an information record confirming light beam having a second wavelength; a condenser configured to condense the reference light beam having the first wavelength emitted from the light source, in the vicinity of each of the position reference regions; and a position detector configured to detect the reference light beam passing through the three-dimensional optical recording medium to detect each of the optional positions of the three-dimensional optical recording medium, wherein the light source emits the recording light beam having the intensity sufficient to record information, on the basis of the detected position of the reference light beam detected by the position detector, and the condenser condenses the recording light beam at each of the optional positions of the three-dimensional optical recording medium.

According to a fourth aspect of the present invention, there is provided a reproducing system for reproducing recorded information from a three-dimensional optical recording medium capable of recording information at three-dimensional optional positions, the reproducing system comprising: a light source configured to irradiate the three-dimensional optical recording medium with light beams of a plurality of patterns having different wavelengths containing at least one of a positioning reference light beam having a first wavelength, and an information reproducing light beam having a second wavelength and an intensity sufficient to reproduce information; a condenser configured to condense the reference light beam having the first wavelength emitted from the light source, in the vicinity of each of the position reference regions which are previously provided at predetermined positions of the three-dimensional optical recording medium and which have optical characteristics different from those of recordable regions, or in the vicinity of each of recording regions for information recorded in the recordable regions; and a position detector configured to detect the reference light beam passing through the three-dimensional optical recording medium to detect each of the optional positions of the three-dimensional optical recording medium, wherein the light source emits the reproducing light beam having the second wavelength, on the basis of the detected position of the reference light beam detected by the position detector, and the condenser condenses the reproducing light beam at each of the optional positions of the three-dimensional optical recording medium.

BRIEF DESCRIPTION OF THE DRAWINGS

In the drawings:

FIGS. 3A and 3B are illustrations for explaining a method for producing a three-dimensional recording medium;

FIG. 4A is a sectional view schematically showing the first preferred embodiment of a recording/reproducing system for a three-dimensional optical recording medium, and FIG. 4B is an expansion view of a circle B in FIG. 4A, according to the present invention;

DESCRIPTION OF THE PREFERRED EMBODIMENTS

Referring now to the accompanying drawings, the preferred embodiments of an information recording/reproducing system according to the present invention will be described in detail below. According to the present invention, a three-dimensional optical recording medium having a position reference region at a predetermined position is used for confirming the position of the focus of the current laser beams in depth directions on the basis of transmitted light beams when the vicinity of the position reference region is irradiated with laser beams, to carry out the fine adjustment of the position of the focus to a desired position on the basis of the current focus position information. The present invention will be described in detail below.

Figure 1:
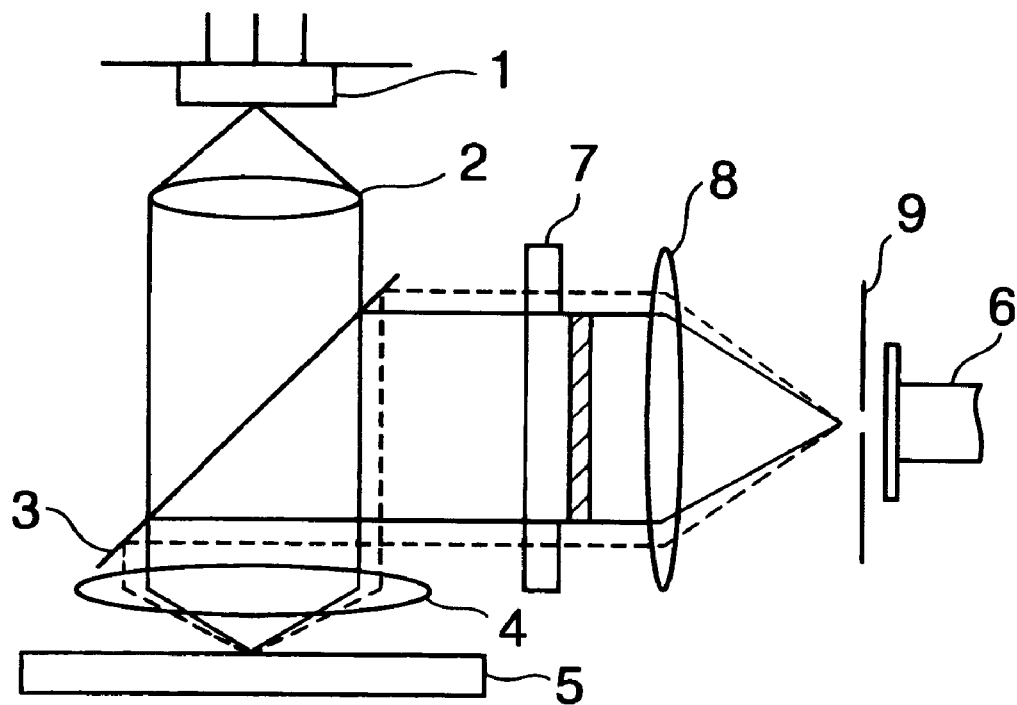
FIG. 1 is a schematic diagram of a principal part of a conventional recording/reproducing system.
Figure 2A:
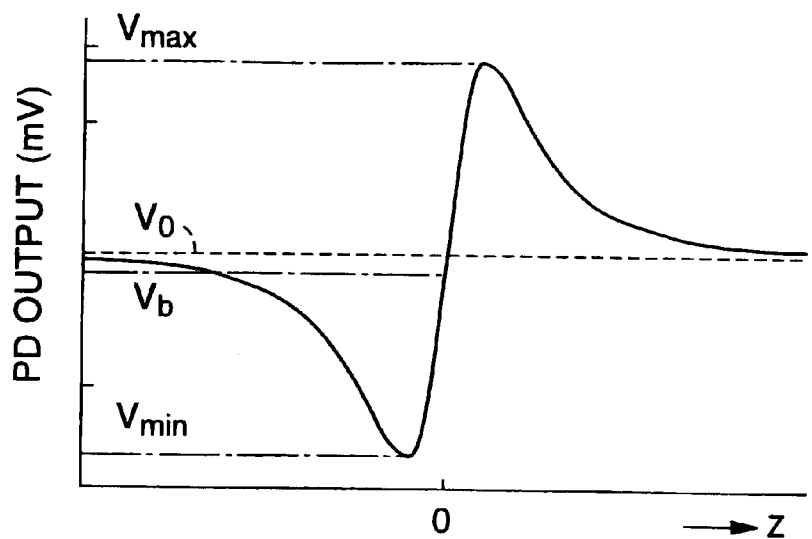
FIG. 2A is a diagram showing transmission characteristics when a three-dimensional optical recording medium.
Figure 2B:
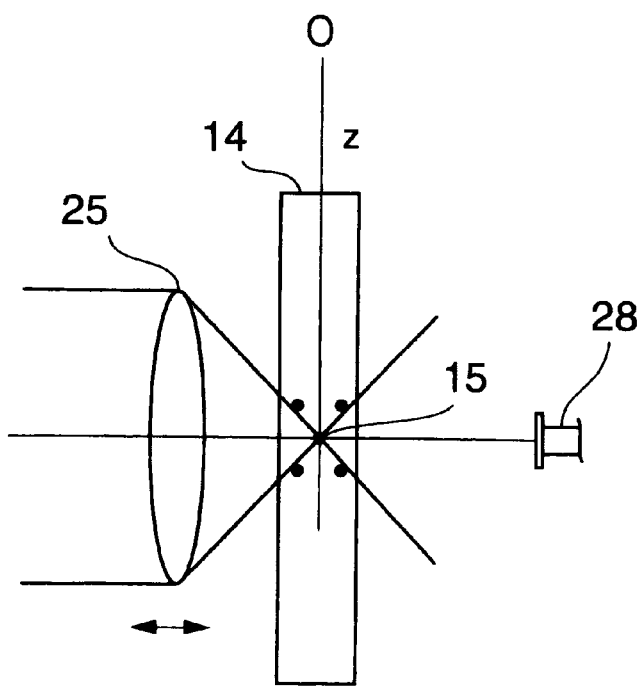
FIG. 2B is a sectional view corresponding to the position of FIG. 2A, according to the present invention is irradiated with light.

FIG. 2A is a transmission characteristic diagram when the first preferred embodiment of a three-dimensional optical recording medium according to the present invention is irradiated with light. In FIG. 2A, the axis of abscissas denotes the distance between a recording medium and the origin (z=0) in thickness directions when a position reference region is the origin, and the axis of ordinates denotes the intensity of the transmitted light beam. In addition, FIG. 2B is a schematic diagram showing the state that laser beams focus in the three-dimensional optical recording medium having the intensity of the transmitted light beam obtained in FIG. 2A. In FIG. 2B, the position of the focus was set in the vicinity of a position reference region 15 having different optical characteristics previously prepared in a sample 14 serving as a three-dimensional optical recording medium, to measure a light beam, which passes through the three-dimensional optical recording medium, by means of a photo detector 28 arranged on the optical axis.

In FIG. 2A, a solid line shows the intensity of the detected light beam as a function of the position z of the focus when the position of the focus is moved in depth directions of the recording medium by changing the relative positions of an objective lens 25 and the recording medium sample 14 shown in FIG. 2B. However, it is assumed that the position reference region 15 is always arranged on the optical axis.

Since the optical characteristics (particularly the refractive index) in the position reference region 15 are different from those in the vicinity thereof, light beams condensed at this position are diffracted, so that the transmitted light intensity varies as shown in FIG. 2A. However, when the position of the focus is moved in a region, in the vicinity of which any position reference regions and information recording regions do not exist, there in no variation in refractive index, so that diffraction does not occur. Therefore, the transmitted light intensity at this time is a constant value ($V_0$) regardless of the position of the focus as shown by the dotted line in FIG. 2A.

The inventors made the present invention after confirming that when the vicinity of a position reference region in a three-dimensional optical recording medium, in which the position reference region having optical characteristics different from those of a recording material is formed, is irradiated with laser beams to move the position of the focus of the laser beams in depth directions of the three-dimensional optical recording medium, the transmitted light thereof monotonously varies in the vicinity of the position reference region as shown in FIG. 2A.

That is, if a three-dimensional optical recording medium having the transmission characteristics shown in FIG. 2A is used, the distance from a position reference region in depth directions is clarified by measuring the transmitted light intensity of the irradiated laser beams. For example, during a recording operation, it is possible to record at a desired depth from the position reference region. In addition, when information recorded in the three-dimensional optical recording medium is reproduced, it is possible to set the focus of the laser beams at a desired depth to reproduce information by correcting the depth calculated from the position reference region, since the depth, at which information has been recorded, is recognized on the basis of the depth from the position reference region.

Referring to FIGS. 3A through 5, the first example of the present invention will be described in detail below. The first example will be described in detail while being divided into the production of a three-dimensional optical recording medium, the production of a layer of a recording material, the production of a position reference region, the acquisition of basic data, a recording process, and a reproducing process.

1. Production of Three-Dimensional Optical Recording Medium

FIGS. 3A and 3B are schematic diagrams for explaining a method for forming a three-dimensional optical recording medium. FIG. 3A shows a process for producing an optical recording medium, and FIG. 3B shows a schematic cross section of a three-dimensional optical medium according to the present invention.

A three-dimensional optical recording medium 10 shown in FIG. 3B comprises a pair of transparent substrates 11, and a layer of a recording material 12 sandwiched between the pair of transparent substrates 11. In the recording material 12, a position reference region is formed at a predetermined depth from the surface thereof by a process which will be described later.

2. Production of Layer of Recording Material

A fullerene ($C_{70}$), a compound (1) expressed by the following chemical formula, and a polystyrene are mixed at a weight ratio of 0.5:30.0:69.5 to be dissolved in toluene. The resulting toluene solution is stored in a cold and dark place a whole day and night so that three kinds of molecules are sufficiently dissolved in toluene. Thus, an applied solution of the toluene solution is prepared.

[Chemical Formula 1]

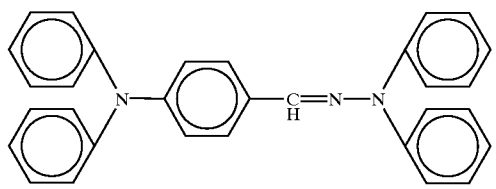

The applied solution thus obtained was dropped on the transparent substrate 11 of, e.g., a glass substrate 3 cm square. Then, the reverse surface of the transparent substrate 11 was heated at 80° C. for 1 hour by means of a heater to vaporize toluene to form an applied film 12a thereon as shown in FIG. 3A. Then, a spacer 13 of 1000 μm was arranged on a portion of the transparent substrate 11 of the glass substrate, on which the applied film 12a was not formed. Then, the transparent substrate 11 was arranged so as to face anther transparent substrate 11 of, e.g., a glass substrate, via the applied film 12a. Thereafter, pressure was uniformly applied to the whole outside surfaces of the pair of transparent substrates 11, 11 to form a layer of a recording material 12 having a thickness of 1000 μm.

The recording material thus obtained is formed of the fullerene ($C_{70}$) and the compound (chemical formula 1) for changing the optical characteristics by the irradiation with light, and the polystyrene serving as a matrix material. The present invention should not be limited to these materials. For example, the materials for changing the optical characteristics by the irradiation with light may be selected from known compounds including other fullerenes, such as $C_{60}$, phthalocyanine compounds, azo compounds, pyrazolone compounds, and naphthalocyanine compounds. In addition, the recording material should not be limited to polystyrenes, but it may be selected from any transparent materials including polycarbonates, polymethylmethacrylates, and phenoxy resins. Alternatively, the recording material may be a photo polymer material or the like wherein an intermolecular or intramolecular reaction occurs by the irradiation with light to modulate its refractive index.

Preferably, the layer of the recording material 12 obtained as described above is rapidly cooled after vaporizing toluene. For example, the transparent substrate 11 of the glass substrate or the like may contact marble or the like having a great heat capacity.

3. Production of Position Reference Region

FIGS. 4A and 4B are schematic sectional views of a recording/reproducing system for a three-dimensional optical recording medium. By this system 20, a three dimensional optical recording medium having a position reference region in a layer of a recording material 12 shown in FIG. 3B was produced.

The aperture for laser beams oscillated from a laser beam source 21 serving as light irradiation means is widened by a beam expander 23, and then, the intensity of the laser beams is controlled by a neutral density filter 24 serving as light-intensity adjusting means. Moreover, the light beams passing through the neutral density filter 24 are condensed at a predetermined position by condensing means, such as an objective lens 25 (e.g., CFICLCD Plan CR 50; Nikon). In addition, a shutter 22 is provided between the laser beam source 21 and the beam expander 23 for controlling the time to irradiate the three-dimensional optical recording medium 10 with light.

The sample 14 having the layer of the recording material 12 is arranged on a sample table 26. The sample table 26 is designed to be movable by moving means 27 so as to scan independently in directions of X, Y and Z axes in order to irradiate the predetermined position of the sample 14 with the laser beams.

Furthermore, a hole 2.8 cm square is formed in the sample table 26 at the center thereof. The sample 14 is positioned so that the recording material 12 is arranged above the hole. The laser beams passing through the sample 14 pass through the hole of the sample table 26, so that the intensity of the central portion of the transmitted light beams is detected by a detector 28 arranged on the optical axis.

By using the system with the above described construction, a first position reference region was prepared. First, a laser beam source 21 for oscillating He-Ne laser of 10 mW was used to set a focus at a position in a depth of 100 $\mu$m from the uppermost surface of the sample 14 to allow the shutter 22 to irradiate a layer 12 of a recording material of the sample 14 with laser beams for 10 milliseconds to prepare a first position reference region 15 at the position of the focus. Moreover, the sample table 26 was moved upwards by 200 $\mu$m in a direction of Z-axis to prepare a second position reference region 15 as shown in FIG. 4B by the same method as the above described method. This was repeated to form five position reference regions 15 at intervals of 200 $\mu$m to produce a three-dimensional optical recording medium 10 for use in a recording/reproducing system according to the present invention.

The position reference regions 15 are preferably stabilized so as not to be varied by recording and reproducing light beams, with which the position reference regions 15 will be irradiated thereafter. Therefore, as the first example of the first preferred embodiment, when the position reference regions 15 are produced by the irradiation with light, the position reference regions 15 are preferably produced by a power which is the same as or greater than those of the recording or reproducing light beams.

Furthermore, while the position reference regions 15 have been produced after forming the layer of the recording material 12, the present invention should not be limited thereto. For example, a recording material containing particles having predetermined optical characteristics dispersed therein may be used as the three-dimensional optical recording medium.

4. Acquisition of Basic Data

When the vicinity of each of the position reference regions of the three-dimensional optical recording medium obtained using the system shown in FIG. 4A is irradiated with laser beams, the transmitted light intensity is measured to obtain basic data for the light transmission characteristics of the three-dimensional optical recording medium.

First, in the acquisition of the basic data, the fine adjustment of the position of the sample table was carried out so as to set the focus at a position apart from the uppermost surface of the three-dimensional optical recording medium by 380 nm. When the focus was set in the range of from 380 $\mu$m to 420 $\mu$m by moving the sample table upwards from the fine-adjusted position by 40 $\mu$m, the transmitted light intensity was measured. The results thereof are shown in the characteristic diagram of FIG. 5.

Furthermore, the intensity of reference light beams for irradiating the three-dimensional optical recording medium during the acquisition of the basic data was set to be 0.1 mW by the neutral density filter 24.

Figure 5:
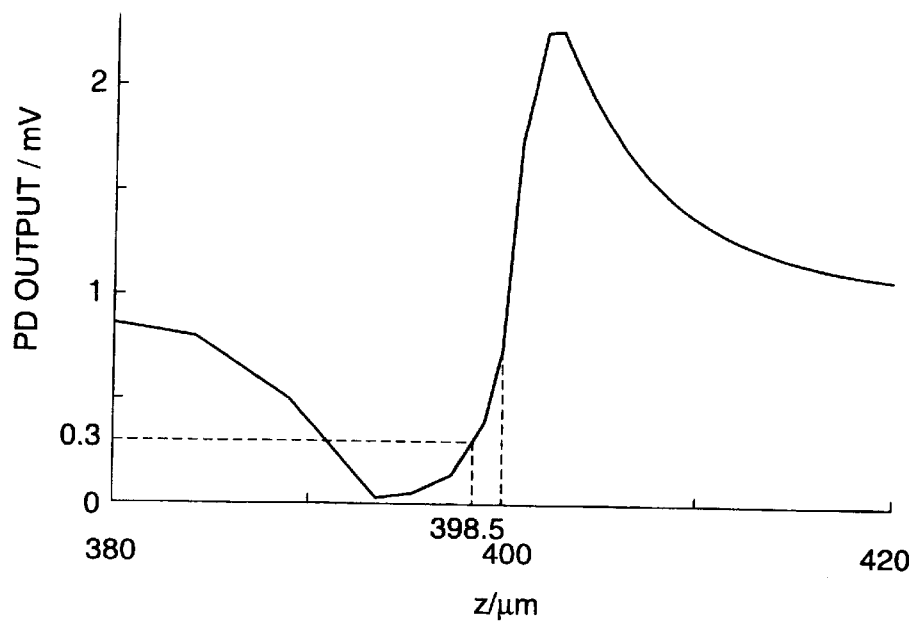
FIG. 5 is a transmission characteristic diagram of a three-dimensional optical recording medium for use in the first preferred embodiment.

In order to surely detect the position reference regions to obtain the basic data shown in FIG. 5, the absorbance as the optical characteristic of the recording medium is preferably 0.05 or more and 0.50 or less. For example, if the absorbance is less than 0.05, there is some possibility that the speed of response may decrease, and if the absorbance exceeds 0.50, there is some possibility that the transmitted light intensity detected by the detector may decrease so that the transmitted light intensity can not precisely detected.

5. Recording Process

Using the system shown in FIG. 4A, the position of the focus of the laser beams was coarsely adjusted so as to be set at a depth of 400 $\mu$m from the uppermost surface of the three-dimensional optical recording medium having the above described acquired basic data, and the measured transmitted light intensity of the reference light beams passing through the three-dimensional optical recording medium at that time was 0.3. Referring to FIG. 5, it can be seen that the focus was set at a position above the position reference region, which was formed at a position of 400 $\mu$m, by 1.5 $\mu$m.

Thus, after the depth of the focus was measured, the sample table was moved upward in a direction of Z-axis by 1.5 $\mu$m which was the difference between the depth of the current focus and the depth of the recording layer, and then, the sample table 24 was moved by 20 $\mu$m only in a direction of X-axis while the shutter 22 was closed. After the neutral density filter 33 was removed, the three-dimensional optical recording medium was irradiated with laser beams having an intensity of 10 mW as recording light beams for 10 ms to record information in the three-dimensional optical recording medium.

While the recording operation has been carried out by 1 bit in this example, a two-dimensional recording operation can be carried out by moving the sample table in directions of X-axis and Y-axis by predetermined distances, respectively. Alternatively, a recording operation can be carried out while changing the depth little by little by simultaneously moving the sample table in directions of X-axis, Y-axis and Z-axis by a predetermined distance.

6. Reproducing Process

The position of the sample table was coarsely adjusted so that the focus was coincident with the depth position of 400 $\mu$m from the uppermost surface of the recorded three-dimensional optical recording medium, and the three-dimensional optical recording medium was irradiated with the reference light beams, the focus of which was set in the vicinity of the position reference region. As a result, it was confirmed that the intensity of the transmitted reference light beams was 1.5, and comparing with the basic data of FIG. 5, the focus was set at a position below the position reference region, i.e., the focus was set at a position below the depth, at which the recording operation was carried out, by 0.7 μm.

The sample table was moved downwards in a direction of Z-axis by the difference between the depth of the current focus and the depth of the recording layer, i.e., by 0.7 μm. Moreover, the sample table was moved in a direction of X-axis to irradiate a position apart from the position reference region by 20 μm with reproducing light beams, so that it was possible to detect a recorded place formed by the recording process. In addition, if a region having information which has been recorded therein is used as the position reference region, the positioning in depth directions may be carried out on the basis of the basic data for the recording region so that the focus of the reproducing light beams is arranged on the recording region.

In the above described first example, light beams of different wavelengths may be used in place of the scanning of the sample table in directions of Z-axis, and a lens having chromatic aberration may be combined with a prism to scan the focus in directions of Z-axis to measure the variation in transmitted light intensity. Furthermore, it is possible to correct the position of the focus of the reproducing light beam to be set to a position deviated along the Z-axis.

While the sample table has been scanned in order to change the relative positions of the sample and the focus, the position of the focus may be scanned by scanning a lens by means of an actuator or the like.

While the sample table has been scanned in three directions of X, Y and Z perpendicular to each other in the above described first example, the movements in directions of X-Y plane may be carried out by scanning the sample table in radial and angular directions.

Figure 6:
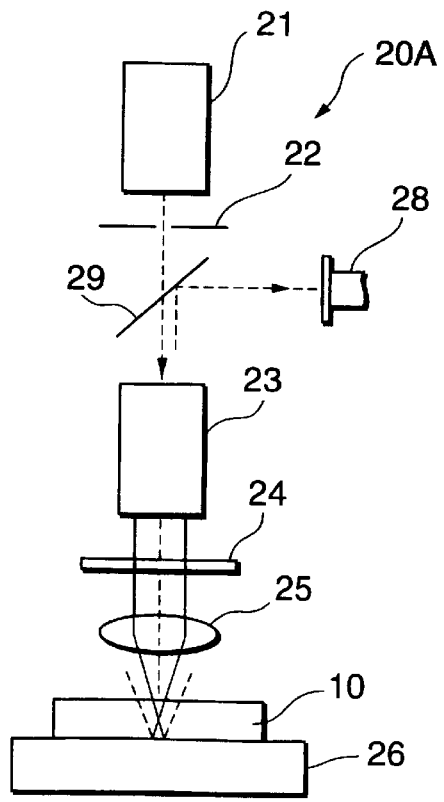
FIG. 6 is a sectional view schematically showing the second preferred embodiment of a recording/reproducing system for a three-dimensional optical recording medium according to the present invention.

FIG. 6 is a schematic diagram of the second preferred embodiment of an information recording/reproducing system 20A for a three-dimensional optical recording medium as a modified example of the system shown in FIG. 4A. As shown in FIG. 6, a beam splitter 29 may be arranged between a laser beam source 21 and an optical lens 25. In this case, the transmitted light beams are reflected on the reverse surface of a three-dimensional optical recording medium 10, and part thereof are turned in a different direction by means of the beam splitter 29 to be detected by a detector 28 arranged on the same side of the laser beam source with respect to the three-dimensional optical recording medium. In this case, a reflecting film is preferably formed on the reverse surface of the three-dimensional optical recording medium 10. In addition, a pinhole (not shown) may be provided in front of the photo detector 28.

Figure 7:
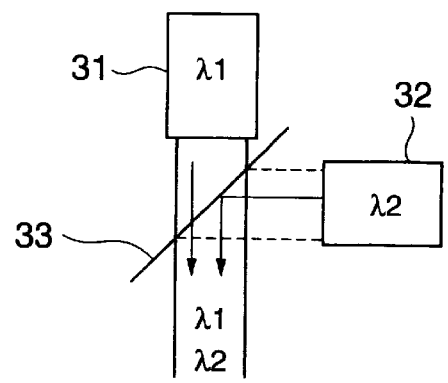
FIG. 7 is a schematic diagram of second and third examples of a recording/reproducing system according to the present invention.
Figure 8:
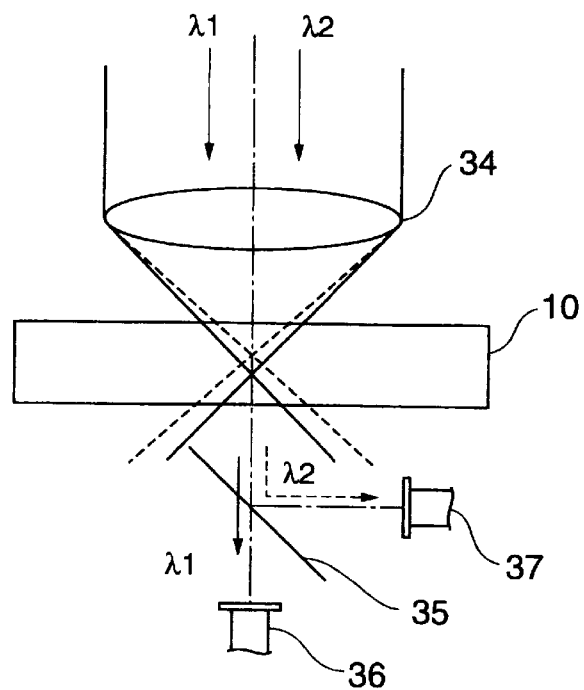
FIG. 8 is a schematic diagram of the second and third examples of a recording/reproducing system according to the present invention.
Figure 9:
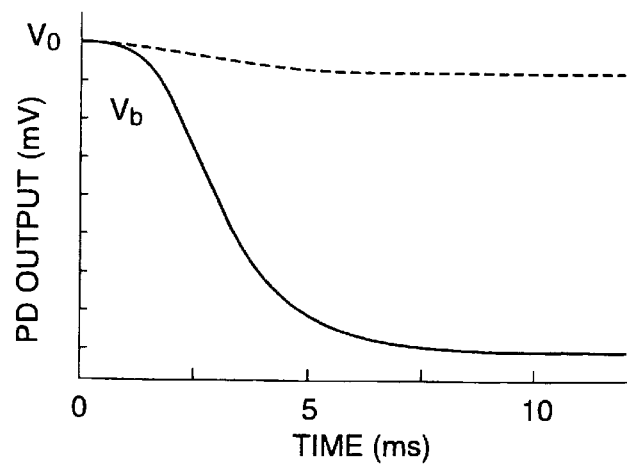
FIG. 9 is a characteristic diagram showing the characteristics of the second and third examples with the characteristics of a comparative example.

Referring to FIGS. 7 through 9, the second and third examples for explaining reproducing and recording processes different from those in the first example will be described below.

The second example is an example where information recorded by the recording process in the first example is reproduced in the sample produced in the first example. As shown in FIG. 7, for example, a dichroism beam splitter 33 (commercially available from Melles Griot: BDL001 or the like) is used to cause parallel rays having wavelengths λ1 (e.g., 580 nm: reference light) and λ2 (e.g., 760 nm: reproducing light) to simultaneously enter an objective lens 34 shown in FIG. 8 so that the optical axes thereof are coincident with each other.

Dye lasers of cwAr$^+$ laser excitation are used as light sources 31 and 32. A birefrigent filter is used to select an oscillation wavelength, and an ND (neutral density) filter is used so that the intensity of light, with which the three-dimensional optical recording medium is irradiated, is set to be 0.1 mw. As dyes, rhodamine 6G (λ1) and LDS751 (λ2) are used. After the above described two light beams pass through a recording medium 10, the light beams are divided into light beams of the respective wavelengths again by mans of a dichroism beam splitter 35.

Then, the intensity of the light beams having the wavelength λ1 passing through the dichroism beam splitter 35 (commercially available from Melles Griot: BDL 001 or the like) is measured by a photo detector 36 arranged on the optical axis, and the focus of the light beams having the wavelength λ1 is adjusted by the same method as the reproducing process in the first example so as to be coincident with the position reference. Moreover, a sample table (not shown) is moved so that the position of the focus is moved to a region, in which information is intended to be reproduced. At this time, as shown in FIG. 8, the light beam having the wavelength λ1 and the light beam having the wavelength λ2 focus at different positions apart from each other by about several μm due to the chromatic aberration of the objective lens 34.

That is, if the focus of the reference light beam having the wavelength λ1 is coincident with the recording region, the focus of the reproducing light beam having the wavelength λ2 is slightly offset from the recording region. Since the effects obtained by changing the refractive index of the recording region to diffract light beams to change the transmitted light intensity on the optical axis are most conspicuous when the focus of irradiation light beams is slightly offset from the recording region in the directions of the optical axis, it is possible to reproduce information by reading the intensity of the light beam having the wavelength λ2 by means of a photo detector 37 arranged on the optical axis. For example, as shown in FIG. 2A, when the focus position is slightly offset from on focus (z=0), the intensity of the detected light beam is most different from the value when it is not recorded (M. Sheik Bahae et al., IEEE J. Quantum Electron, Vol. 26, 760, 1990). The photo detector 37 for detecting the reproducing light beams may be a divided photo detector similar to the reproduction in the current DVD (Digital versatile Disk).

Referring to FIGS. 7 through 9, the third example including a recording process different from that in the first example will be described below. In the third example, it is assumed that the wavelength of a recording light beam and a reference light beam for adjusting the depth is λ1, and the wavelength of a reproducing light beam for the confirmation of recording is λ2. In this example, it is confirmed that a recording operation ends when information or position reference region is recorded in the sample prepared in the first example.

As shown in FIG. 7, a dichroism beam splitter 33 (commercially available from Melles Griot: BDL001 or the like) is used for causing parallel light beams having the wavelength λ1 (e.g., 580 nm: reference light and recording light) and the wavelength λ2 (e.g., 760 nm: confirmation light) to simultaneously enter the objective lens 34 shown in FIG. 8 while the optical axes thereof are coincident with each other.

Dye lasers of cWAr$^+$ laser excitation are used as light sources 31 and 32. A birefrigent filter is used to select an oscillation wavelength, and an ND filter is used so that the intensity of light beams, with which the three-dimensional optical recording medium is irradiated, is set to be 0.1 mW. As dyes, rhodamine 6G ($\lambda 1$) and LDS751 ($\lambda 2$) are used.

Then, the intensity of the light beams having the wavelength $\lambda 1$ passing through the dichroism beam splitter 35 (commercially available from Melles Griot: BDL 001 or the like) after passing through the recording medium 10 is measured by the photo detector 36 arranged on the optical axis, and the focus of the light beams having the wavelength $\lambda 1$ is adjusted by the same method as the recording process in the first example so as to be coincident with the position reference region. Similar to the recording process in the first example, after a sample table (not shown) is moved so that the focus position is moved to a region, in which information is intended to be recorded, the intensity of the light beam having the wavelength $\lambda 1$ is modulated to 10 mW to start a recording operation. At this time, as shown in FIG. 8, the light beam having the wavelength $\lambda 1$ and the light beam having the wavelength $\lambda 2$ focus at different positions apart from each other by about several $\mu$m due to the chromatic aberration of the objective lens 34.

That is, if the focus of the light beam having the wavelength $\lambda 1$ is coincident with the reference region, the focus of the light beam having the wavelength $\lambda 2$ is slightly offset from the recording region. Since the effects obtained by changing the refractive index of the recording region to diffract light beams to change the transmitted light intensity on the optical axis are most conspicuous when the focus of irradiation light beams is slightly offset from the recording region in the directions of the optical axis, if the intensity of the light beam having the wavelength $\lambda 2$ is read by means of a photo detector 37 arranged on the optical axis, it can be seen that the detected output falls and the recording operation ends after about 5 ms as shown by a solid line in the characteristic diagram of FIG. 9.

On the other hand, when the focus of the light beams having the wavelength $\lambda 1$ is coincident with the recording region, the light intensity detected by the photo detector 36 arranged on the optical axis hardly varies before and after the recording operation. Therefore, when information is recorded by the recording light beam having the wavelength $\lambda 1$, if the waveform having the wavelength $\lambda 2$ is detected, it is possible to determine whether the recording operation is completed. That is, when the waveform of the solid line is detected as the intensity of the light beam having the wavelength $\lambda 2$, the recording operation is completed.

In the above described second and third examples, a dichroism prism having a wavelength selecting coating disclosed in Japanese Patent Laid-Open No. 8-339571 may be used for mixing light beams having two different wavelengths.

While the depth in the vicinity of the position reference region has been corrected even in the reproduction of the recorded information in the above described second and third examples, the information recorded region may be used during the production in place of the position reference region. That is, the operation for providing the position reference region may be the same as the recording operation since the physical property of the region irradiated with light is only changed by the irradiation with light.

While the cwAr$^+$ laser has been used as the light source in the second and third examples, the present invention should not be limited thereto, but a semiconductor laser may be used as the light source.

Referring to FIGS. 10 through 13, the fourth through seventh preferred embodiments of a recording/reproducing system for a three-dimensional optical recording medium according to the present invention, which has wavelength selecting means for adjusting the position of the focus of light beams in depth directions, will be described below.

Figure 10:
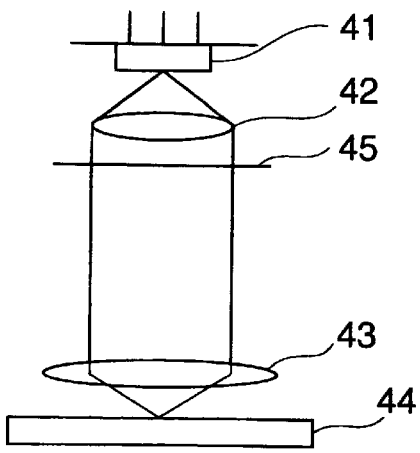
FIG. 10 is a schematic diagram of a principal part of the third preferred embodiment of a recording/reproducing system according to the present invention.

FIG. 10 shows a principal part of the fourth preferred embodiment of a three-dimensional optical recording/reproducing system according to the present invention. In FIG. 10, outgoing beams having a wide spectrum or a plurality of oscillation lines from a laser 41 are collimated by means of a collimator lens 42 having a smaller effective aperture than that of a lens 43.

When data are written in an optical recording medium 44 at a predetermined position in a first depth direction, a wavelength selecting device 45 is operated so as to transmit light beams having a peak at a first wavelength according to data to be written. By allowing only the light beams having the peak at the first wavelength passing through the wavelength selecting device 45 to enter the lens 43, it is possible to write data at the predetermined position in the first depth direction.

Then, when data are written at a position in a second depth direction different from the first depth direction from the optical recording surface, the state of the wavelength selecting device 45 is changed so as to transmit only light beams having a peak at a second wavelength so that the light beams focus at a position to be written in the second depth direction. By allowing the collimated light beams to enter the wavelength selecting device 45, it is possible to allow only the light beams having the peak at the second wavelength to enter the lens.

Thus, by utilizing that light beams having different peaks have different focus positions, it is possible to write bits at a plurality positions in depth directions without changing the relative positions of a lens and an optical recording medium.

By using a chromatic aberration lens having different focal lengths in accordance with wavelength as the lens 43, it is possible to set the focus of laser beams having different wavelengths at different depth positions in the recording medium 44.

Figure 11:
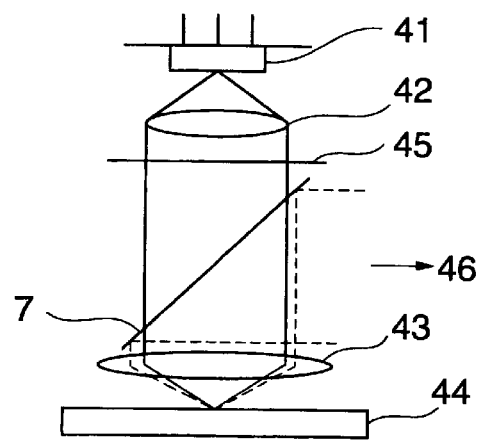
FIG. 11 is a schematic diagram of a principal part of the fourth and fifth preferred embodiments of a recording/reproducing system according to the present invention.

FIG. 11 schematically shows a recording/reproducing principle in a three-dimensional recording/reproducing system according to the present invention. Out of outgoing beams from the laser, only light beams having wavelengths ($\lambda 1$, $\lambda 2$) corresponding to the writing/reading of data enter the lens 43.

FIG. 11 shows a principal part of the fifth preferred embodiment of a recording/reproducing system according to the present invention. The outgoing beams from the laser 43 must have at least two resoluble oscillation lines. In general, a light beam having a short wavelength is used as a writing light beam, and a light beam having a long wavelength is used as a reading light beam. However, if the relationship between the intensity Is of the light beam having the short wavelength and the intensity Il of the light beam having the long wavelength meets "Il>10·Is", the light beam having the long wavelength may be used as the writing light beam, and the light beam having the short wavelength may be used as the reading light beam.

The outgoing beams from the laser 41 are collimated by a collimator lens 42 having a smaller effective aperture than that of the lens 43. Since the lens 43 has chromatic aberration, if the distance between the lens 43 and the optical recording medium 44 is adjusted so that the focus of the writing light beams is the bit center, the reading light beams focus at a position slightly offset from the bit in a depth direction of the optical recording medium.

The transmitted/diffracted light beams from the optical recording medium are reflected on the lower layer of the medium, and part thereof are further reflected on a half mirror 47 to be transmitted to a photo detecting system 46. The photo detecting system 46 has at least a photo detector which is sensitive to only the reading light and which is not sensitive to the writing light. For example, the photo detecting system 46 has only to have at least a wavelength selecting device for transmitting only the reading light, and a photo detector.

Figure 12:
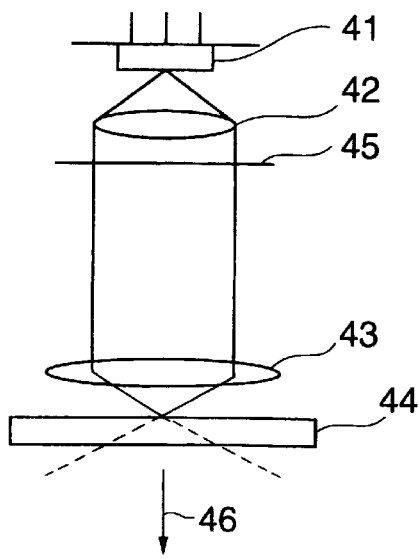
FIG. 12 is a schematic view of a principal part of the fourth and fifth preferred embodiments of a recording/reproducing system according to the present invention.

FIG. 12 shows a principal part of the fifth preferred embodiment of a recording/reproducing system according to the present invention similar to FIG. 11. The difference between FIGS. 11 and 12 is that the reading light transmitted/diffracted by the optical recording medium 44 is transmitted to the photo detecting system 46. Similar to FIG. 11, the photo detecting system 46 has at least a photo detector which is sensitive to only the reading light and which is not sensitive to the writing light.

FIGS. 11 and 12 also show a principal part of the sixth preferred embodiment of a recording/reproducing system according to the present invention. The outgoing beams from the laser 41 having a wide spectrum or oscillation lines are collimated by a collimator lens 42 having a smaller effective aperture than that of the lens 43. In the optical recording medium 44, in order to read data written at different depths from the surface, the state of the wavelength selecting device 45 is previously changed so as to transmit only light beams having a wavelength according to data to be read.

By allowing the collimated light beams to enter the wavelength selecting device 45, it is possible to allow only light beams having a specific wavelength to enter the lens. If a chromatic aberration lens having different focal lengths according to wavelength is used as the lens 43, the reading light beams can be condensed in the vicinity of bits at different depths without changing the distance between the lens 43 and the optical recording medium 44.

In FIGS. 11 and 12, the wavelength selecting device 45 may be arranged between the optical recording medium 44 and the photo a detecting system 46.

The operation of the fourth preferred embodiment will be described below. If the recording/reproducing system according to the present invention is used, it is possible to write data at different depth positions from the surface of the optical recording medium by utilizing the chromatic aberration of the lens 43 without changing the distance between the lens 43 and the optical recording medium 44.

For example, if the wavelength selecting device 45 comprises a liquid crystal filter for simultaneously transmitting a plurality of oscillation lines, it is possible to simultaneously write a plurality of data. Alternatively, if the wavelength selecting device 45 comprises a rotating prism for transmitting only a single oscillation line, it is possible to write data one by one.

If the recording/reproducing system according to the present invention is used, it is possible to write data and confirm the wiring operation without changing the distance between the lens and the recording medium by condensing writing light beams at the center of a bit and by condensing reading light beams at a position slightly offset from the center of the bit in a depth direction.

For example, it is possible to always confirm the completion of the writing operation by allowing the wavelength selecting device 45 to simultaneously transmit two light beams having different wavelengths. In this case, the reading light intensity Ir is preferably sufficiently smaller than the writing light intensity Iw so as to prevent an interaction between two light beams. In particular, the relationship of "Ir<Iw/10", is preferably established. Alternatively, it is possible to confirm the completion of the writing operation by allowing the wavelength selecting device 45 to transmit the reading light beams for a short time (T seconds or less and 1 ms at the maximum) after allowing the wavelength selecting device 45 to transmit the writing light beams for a predetermined period of time (T seconds).

Referring to the accompanying drawings, the seventh preferred embodiment of a recording/reproducing method for a three-dimensional optical recording medium according to the present invention will be described below.

Figure 13:
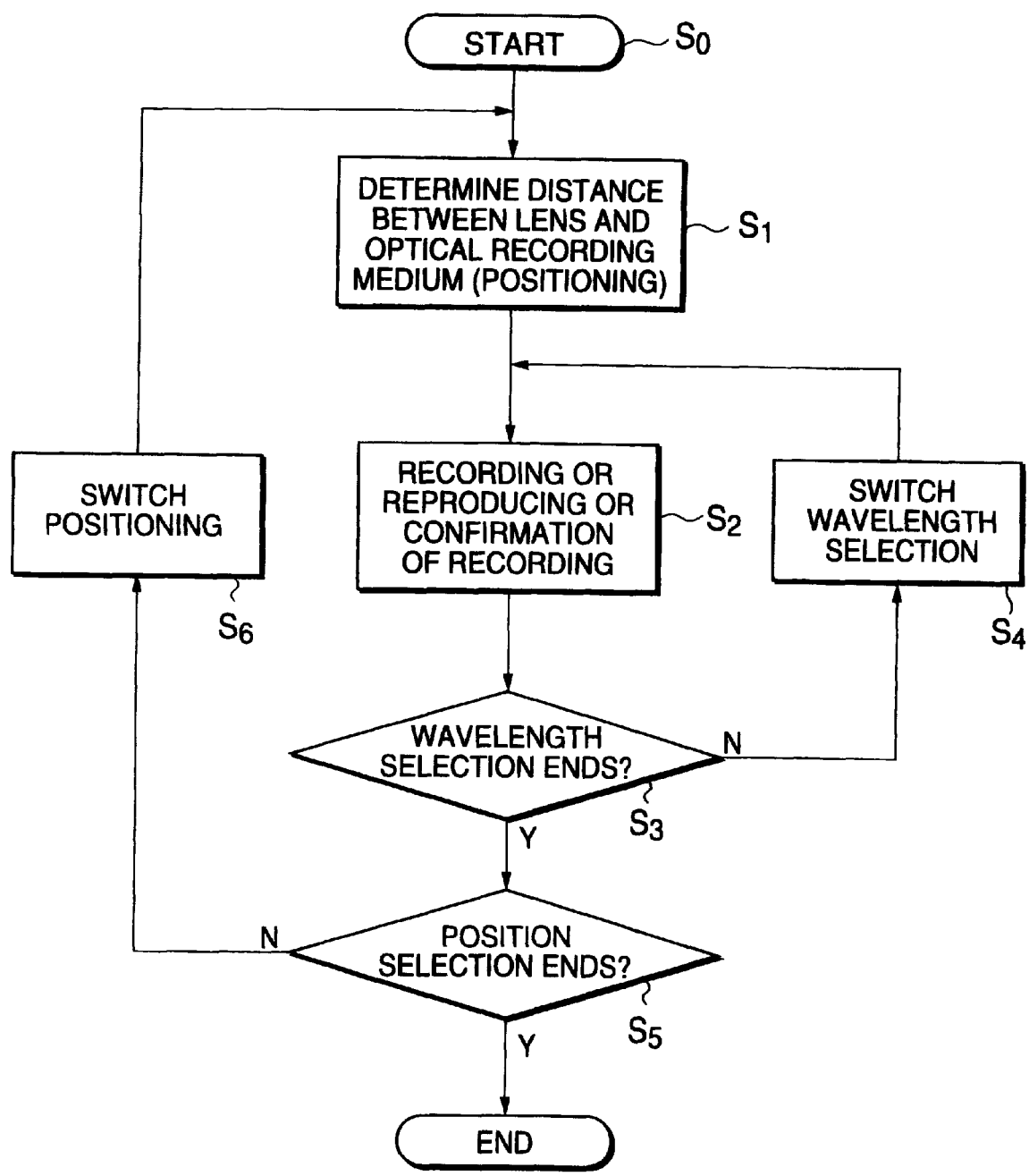
FIG. 13 is a flow chart showing the operation of the sixth preferred embodiment of a recording/reproducing system according to the present invention.

FIG. 13 is a flow chart of the seventh preferred embodiment of a recording/reproducing method according to the present invention. According to the conventional method, the position of the lens or the optical recording medium must be changed every one bit to write/read in/from the optical recording medium. On the other hand, according to the present invention, after the positions of the lens and the optical recording medium are determined (step S1), 1-bit information is write/read. Then, the wavelength of light beams is changed by means of the laser, the wavelength selecting device and so forth (step S4) to write/read 1-bit information in/from the optical recording medium at a different position in depth directions. When information is subsequently written/read, the lens and the optical recording medium are moved in radial and circumferential directions of the optical recording medium (step S6) to, repeat the new writing/reading operation of 1-bit information.

If the recording/reproducing system and method of the present invention are used, the bit written at a depth different from the surface of the recording medium can be read without changing the distance between the lens and the recording medium by allowing reading light beams having different wavelengths to enter a lens having chromatic aberration.

Furthermore, the present invention should not be limited to the above described preferred embodiments, and can be embodied in various ways without departing from the principle of the invention. For example, while the lens for condensing light has been used in the above-described fourth through seventh preferred embodiments, a condensing device using the acoustic optical effect may be substituted for the lens. In this case, in order to provide a sufficiently great chromatic aberration, the state of the acoustic lens is preferably sequentially changed to access bits having difference depths one by one.

In addition, while the laser having the wide spectrum or the plurality of oscillation lines and the wavelength selecting device have been used in the above described fourth through seventh preferred embodiments, an oscillator capable of changing the oscillation frequency by the injection current modulation or the wavelength modulation using an external resonator may be used. Alternatively, a plurality of lasers having different characteristics may be used.

In the three-dimensional optical recording medium, it is required to condense laser beams in the recording medium using a lens in order to record data in depth directions. In the conventional recording/reproducing system/method wherein a single wavelength laser is combined with a lens having no chromatic aberration, it is required to change the distance between the lens and the recording medium in order to write or read bits in different directions from the recording medium.

According to the present invention, it is possible to decrease the frequency in changing the distance between the lens and the recording medium by using the chromatic aberration of the lens, so that it is possible to rapidly write and read.

What is claimed is:

1. A recording system for recording information in a three-dimensional optical recording medium of a light passing-through type including a three-dimensional recordable region and position reference regions having optical characteristic which are different from those of said recordable region and which are previously provided at predetermined positions, said recording system comprising:

a light source configured to emit light beams to irradiate said three-dimensional optical recording medium, said light beams comprising a positioning reference light beam having a first wavelength, an information recording light beam having an intensity sufficient to record information, and an information record confirming light beam having a second wavelength;

a condenser configured to condense said reference light beam having the first wavelength emitted from said light source, in the vicinity of each of said position reference regions; and a position detector configured to detect said reference light beam passing through said three-dimensional optical recording medium of said light passing-through type;

wherein said light source emits said recording light beam having the intensity sufficient to record information, on the basis of the detected position of said reference light beam detected by said position detector, and said condenser condenses said recording light beam in said three-dimensional recordable region of said three-dimensional optical recording medium of said light passing-through type.

2. The recording system as set forth in claim 1, wherein said light source comprises a laser beam source for oscillating a laser beam, said condenser comprises an objective lens for condensing said laser beam, which has a controlled intensity, at a predetermined position in said three-dimensional optical recording medium, and said position detector comprises a photo detecting system for detecting the intensity of said reference light beam passing through said three-dimensional optical recording medium.

3. The recording system as set forth in claim 2, which further comprises a wavelength selecting device configured to select a light beam having a specific wavelength outputted from said laser beam source.

4. The recording system as set forth in claim 1, wherein said light source comprises a semiconductor laser for oscillating laser beams.

5. The recording system as set forth in claim 1, wherein said optical characteristics of said three-dimensional optical recording medium include an absorbance of 0.05 or more and 0.50 or less.

6. A reproducing system for reproducing information recorded on a three-dimensional recording medium having a three-dimensional recordable region, said reproducing system comprising:

a light source configured to emit light beams to irradiate said three-dimensional optical recording medium, said light beams comprising a positioning reference light beam having a first wavelength, and an information reproducing light beam having a second wavelength and an intensity sufficient to reproduce information;

a condenser configured to condense said reference light beam having the first wavelength emitted from said light source, in the vicinity of each of position reference regions which are previously provided at predetermined positions of said three-dimensional optical recording medium and which have optical characteristics different from those of said recordable region, or in the vicinity of each of recording regions for information recorded in said recordable region; and a position detector configured to detect said reference light beam passing through said thee-dimensional optical recording medium to detect said recordable region of said three-dimensional optical recording medium, wherein said light source emits said reproducing light beam having the second wavelength, on the basis of the detected position of said reference light beam detected by said position detector, and said condenser condenses said reproducing light beam at said recordable region of said three-dimensional optical recording medium.

7. The reproducing system as set forth in claim 6, wherein said light source comprises a laser beam source for oscillating a laser beam, said condenser comprises an objective lens for condensing said laser beam, which has a controlled intensity, at a predetermined position in said three-dimensional optical recording medium, and said position detector comprises a photo detecting system configured to detect the intensity of said reference light beam passing through said three-dimensional optical recording medium.

8. The reproducing system as set forth in claim 7, which further comprises a wavelength selecting device configured to select a light beam having a specific wavelength outputted from said laser beam source.

9. The reproducing system as set forth in claim 6, wherein said light source comprises a semiconductor laser for oscillating laser beams.

10. The reproducing system as set forth in claim 6, wherein said optical characteristics of said three-dimensional optical recording medium include an absorbance of 0.05 or and 0.50 or less.

11. A recording system for recording information in a three-dimensional optical recording medium of a light passing-through type and including a recordable region, and position reference regions having optical characteristics different from those of said recordable region and which are provided at predetermined positions, said recording system comprising:

a light emitting mechanism configured to emit light beams so as to pass through said three-dimensional optical recording medium, said light beams comprising a positioning reference light beam having a first wavelength, an information recording light beam having an intensity sufficient to record information and said first wavelength, and an information record confirming light beam having a second wavelength which is different from said first wavelength;

a condenser configured to condense said positioning reference light beam having the first wavelength emitted from said light emitting mechanism, to focus said positioning reference light beam having said first wavelength in the vicinity of each of said position reference regions, and to condense said information recording light beams and said information record confirming light beams which are emitted from said light emitting mechanism and which respectively have the first and second wavelengths, to focus said information recording light beams and said information record confirming light beams at respective positions which are offset each other; and a detector configured to detect the intensity of said positioning reference light beam passing through said three-dimensional optical recording medium;

a moving mechanism configured to move a focus point of said information recording light beam, which is emitted from said light emitting mechanism and passing through said three-dimensional optical recording medium, on the basis of the detected result of the intensity of the positioning reference light beam which passes through said recording medium and is detected by said detector, wherein said light emitting mechanism emits said information recording light beam passing through said recording medium to record information in said recordable region, and the completion of recording information is confirmed by detecting the intensity of said information recording confirming light beam having said second wavelength and passing through said recording medium.

12. A reproducing system for reproducing information recorded in a three-dimensional recording medium having a three-dimensional recordable region by a reproducing light passing though said recording medium, said reproducing system comprising:

a light emitting mechanism configured to emit a light beam to pass through said three-dimensional optical recording medium, said light beam comprising a positioning reference light beam having a first wavelength and an information reproducing light beam, said reproducing light beam having an intensity sufficient to reproduce information and having a second wavelength which is different from said first wavelength;

a condenser configured to condense said positioning reference light beam having the first wavelength emitted from said light emitting mechanism, to focus in the vicinity of each of position reference regions which are previously provided at predetermined positions of said three-dimensional optical recording medium and which have optical characteristics different from those of said recordable region, or in the vicinity of each of recording regions for information recorded in said recordable region, and to condense said information reproducing light beam which is emitted from said light emitting mechanism with said second wavelength so as to focus at a focus point which is different from the focus point of said positioning reference light beam;

a detector configured to detect the intensity of said positioning reference light beam passing through said three-dimensional optical recording medium;

a moving mechanism configured to move said focus point in the recording medium of said information reproducing light beam, which is emitted from said light emitting mechanism and passing through said three-dimensional optical recording medium, on the basis of the detected result of the intensity of the positioning reference light beam which passes through said recording medium and is detected by said detection means; and wherein said reproducing system reproduces said information recorded in said recording medium by detecting the intensity of said information reproducing light beam which is emitted from said light emitting mechanism and passes through said recording medium.

* * * * *